(12) United States Patent
Silverstein et al.

(10) Patent No.: US 6,339,463 B1
(45) Date of Patent: Jan. 15, 2002

(54) ENHANCED VIEWING ANGLE PERFORMANCE ON NON-POLARIZER BASED COLOR REFLECTIVE LIQUID CRYSTAL DISPLAY USING A FIBER-OPTIC FACEPLATE

(75) Inventors: Louis D. Silverstein, Scottsdale, AZ (US); Thomas G. Fiske, Campbell, CA (US); Greg P. Crawford, Providence, RI (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/827,384

(22) Filed: Mar. 27, 1997

(51) Int. Cl.[7] ..................... G02F 1/1335; G02F 1/1347; G02F 1/137
(52) U.S. Cl. .................. 349/159; 349/110; 349/78; 349/176; 385/901
(58) Field of Search ................ 349/159, 176, 349/78, 110; 385/129, 130, 132, 901

(56) References Cited

U.S. PATENT DOCUMENTS

| | | | |
|---|---|---|---|
| 3,848,965 A | * | 11/1974 | Adams, Jr. et al. |
| 4,005,929 A | * | 2/1977 | Adams et al. ................ 349/63 |
| 4,349,817 A | | 9/1982 | Hoffman et al. |
| 4,468,137 A | * | 8/1984 | Hilsum et al. .............. 374/160 |
| 5,035,490 A | | 7/1991 | Hubby, Jr. |
| 5,148,297 A | * | 9/1992 | Ishii et al. ..................... 349/79 |
| 5,181,130 A | | 1/1993 | Hubby, Jr. |
| 5,396,351 A | | 3/1995 | Gessel |
| 5,442,467 A | | 8/1995 | Silverstein et al. ......... 385/901 |
| 5,659,378 A | | 8/1997 | Gessel ........................ 349/159 |
| 5,959,711 A | | 9/1999 | Silverstein et al. ......... 349/110 |

FOREIGN PATENT DOCUMENTS

| | | |
|---|---|---|
| EP | 0 426 291 | 5/1991 |
| JP | 6-3691 | 1/1994 |
| WO | WO 94/10260 | 5/1994 |

* cited by examiner

Primary Examiner—James A. Dudek
Assistant Examiner—Tai V. Duong
(74) Attorney, Agent, or Firm—Oliff & Berridge, PLC

(57) ABSTRACT

A non-polarizing, Bragg-reflecting liquid crystal display is provided including a first and second substrate, liquid crystal material located between the first substrate and the second substrate. A fiber-optic faceplate may function as a first surface. Alternatively, a fiber-optic faceplate may be located on the side of the first substrate opposite from the liquid crystal layer. The fiber-optic faceplate may include optical fibers that extend between a front face and a rear face and fiber cladding materials located between the optical fibers. The fiber cladding material may be further opaquely masked on the front face.

21 Claims, 12 Drawing Sheets

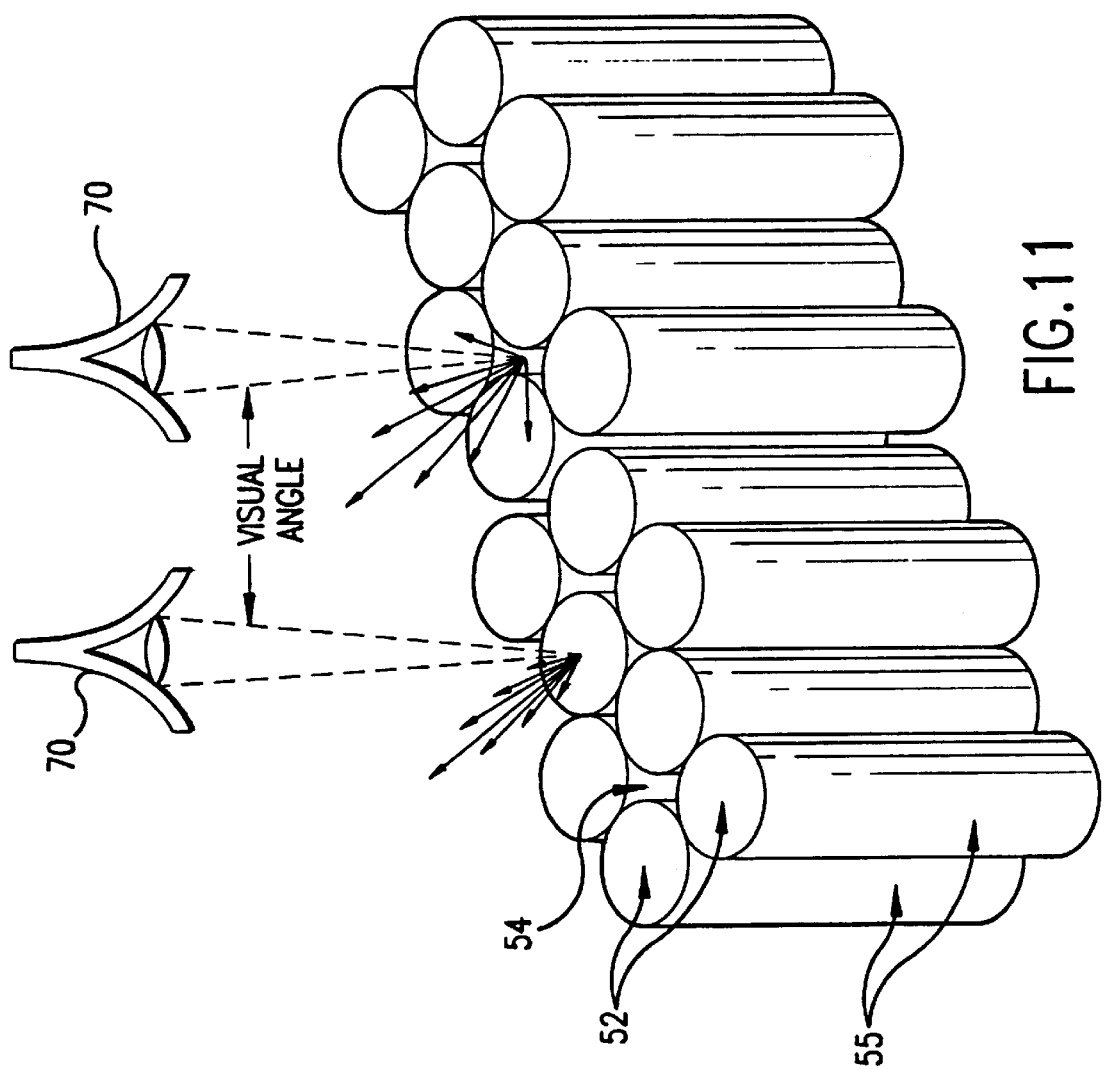

ENHANCED VIEWING ANGLE PERFORMANCE ON NON-POLARIZER BASED COLOR REFLECTIVE LIQUID CRYSTAL DISPLAY USING A FIBER-OPTIC FACEPLATE

BACKGROUND OF THE INVENTION

1. Field of the Invention

This invention generally relates to a non-polarizing Bragg-reflecting liquid crystal display which includes a FOFP located on the front surface of the reflective display.

2. Description of Related Art

Bragg-reflecting displays are well known in the art. FIGS. 1–5 show several types of conventional Bragg-reflecting liquid crystal displays (LCDs). For example, FIG. 1 shows a display that uses cholesteric LC materials, FIG. 2 shows a display that uses liquid crystals with polymer stabilized cholesteric textures (PSCT), FIG. 3 shows a display that uses liquid crystals with surface stabilized cholesteric textures (SSCT), FIG. 4 shows a display that uses polymer dispersed cholesteric liquid crystal (PDCLC) and FIG. 5 shows a display that uses holographically formed polymer dispersed liquid crystal (H-PDLC). A brief description of each of these five types of displays is provided below.

FIG. 1a shows a first substrate 10, a second substrate 20 and cholesteric liquid crystal materials located between the first and second substrates. In the off-state, a single domain reflects light with the approximate wavelength, $\lambda=nP$, that satisfies the Bragg condition, where n is the average index of fraction and P is the pitch length associated with the chiral liquid crystal. The pitch length governs the selective wavelength or color to be reflected. All other wavelengths of light are transmitted. The off-state configuration of the LC is referred to as the planar texture as shown in FIG. 1a. As shown in FIG. 1b, upon application of an electric field by a voltage source 25, the pitch axes form an intermediate disorganized state known as the focal conic texture. This state is weakly scattering and the background (usually black) is easily visible. The focal conic state is metastable and may remain for hours before relaxing back to the planar texture (FIG. 1a). As shown in FIG. 1c, when a larger electric field is applied, all the cholesteric LC molecules align parallel to the field (for an LC material with positive dielectric anisotropy, $+\Delta\epsilon$) and the display is transparent so that the background is observed. This is therefore a monochrome display that typically operates between a reflected color $\lambda$ and the color of the background which is usually a black absorber (not shown). The angular dependency of the display is strongly dictated by the Bragg condition, $\lambda=nP\cos\theta$, where $\theta$ is the angle between an observer and the normal to the substrate 10. Therefore, as the source of illumination and observer move off axis, the peak reflection shifts to shorter wavelengths.

The PSCT display shown in FIG. 2 operates in a similar manner to the display shown in FIG. 1, except a small amount of polymer forming network is added to stabilize the focal conic state indefinitely. As shown in FIG. 2a, the display operates according the Bragg condition, $\lambda=nP$, in the off state. When a low electric field is applied as shown in FIG. 2b, the focal conic texture forms. However, the polymer network stabilizes the focal conic texture so that the electric field can be turned off and the focal conic texture remains indefinitely. Upon application of a larger electric field as shown in FIG. 2c, a completely aligned texture arises (for LC materials with positive dielectric anisotropy, $+\Delta\epsilon$). After the field is removed, the configuration relaxes back to the planar texture in FIG. 2b. This display is typically operated between the planar texture (FIG. 2a) and the focal conic texture (FIG. 2b) for color monochrome operation and bistable memory operation. The angular dependence of the display is also strongly dictated by the Bragg condition, $\lambda=nP\cos\theta$, where $\theta$ is the angle between the observer and the normal to the substrate 10.

The SSCT display shown in FIG. 3 operates under the same principles as the PSCT display except a random-type surface alignment is used instead of the polymer network. FIG. 3a shows the planar texture, FIG. 3b shows the focal conic texture and FIG. 3c shows the aligned texture. The random-type, non-rubbed surface alignment gives added stability to the focal conic texture (FIG. 3b) for bistable memory operation.

The PDCLC display shown in FIG. 4 also utilizes Bragg-reflection in a manner similar to that in FIGS. 1–3, except the LC configuration is different. The PDCLC employs droplets of cholesteric LC material dispersed in an isotropic polymer. The cholesteric LC material is of the negative dielectric type ($-\Delta\epsilon$). In the off state shown in FIG. 4a, the stable concentric director configuration is nearly transparent. As shown in FIG. 4b, upon application of an electric field, the cholesteric LC molecules align perpendicular to the field direction because of their $-\Delta\epsilon$ and form the planar texture within the droplets. Therefore, the display is reflecting in the field-on state. After the field is removed, the planar texture (FIG. 4b) reverts back to the concentric texture (FIG. 4a). The angular dependence of the display is also strongly dictated by the Bragg condition, $\lambda=nP\cos\theta$.

The H-PDLC display shown in FIG. 5a uses optical interference techniques to phase separate the droplets of nematic LC and polymer into separate and distinct planes. This sets up a modulation in droplet densities, regions of droplets and regions of polymer. The resulting optical interference of this refractive index modulation is strongly dictated by the Braggs condition. The angular dependence of the display is also strongly dictated by the Bragg condition, $\lambda=nP\cos\theta$. The H-PDLC display is advantageous because it can ideally reflect 100% of the incident illumination at the Bragg wavelength resulting in a brighter color display compared to those shown in FIGS. 1–4. As shown in FIG. 5b, upon application of an electric field, the refractive index modulation disappears if the ordinary index of refraction of the LC ($n_o$) matches that of the polymer ($n_p$) and all light is transmitted. After the electric field is turned off, the display relaxes back to the reflecting state shown in FIG. 5a.

Fiber-optic faceplates (FOFPs) are also known in the art. U.S. Pat. Nos. 5,035,490 and 5,181,130 to Hubby, the subject matters of which are incorporated herein by reference, relate to reflective twisted nematic (TN) LCDs that utilize polarizers and FOFPs. The polarizers polarize the light passing through the LC cell. However, these displays are not Bragg-reflecting displays. Rather, incident illumination is polarized on input and passes through the entire LC cell and strikes a specular reflector that sends the light ray back through the LC cell, through at least one polarizer, used to analyze the polarization state exiting the LC cell, and out through the FOFP. The FOFP functions to expand the viewing angle and minimize the pixel "shadowing" of these traditional reflective twisted nematic LCDs.

Further, U.S. Pat. No. 5,442,467 and U.S. application Ser. Nos. 08/473,887 and 08/761,992, the subject matters of which are incorporated herein by reference, relate to direct-view transmissive color LCDs that utilize FOFPs. These direct view transmissive LCDs also utilize polarizers. The FOFP also acts as a front containing element adjacent to the LC layer. The FOFP provides azimuthal averaging of off-axis light. The azimuthal averaging properties of the FOFP result in symmetrical viewing cones, effectively averaging out the typical LCD anisotropy.

The front FOFP of the direct view display in U.S. application Ser. No. 08/761,992 includes an array of individual optical fibers that are fused together with an interstitial cladding material and then cut and polished to a desired thickness to form a plate. The creation of FOFPs with varying optical characteristics is well known in the art. The optical fibers are designed to transmit through total internal reflection light incident at controlled input or acceptance angles while rejecting or absorbing light incident at larger angles.

Prior applications of FOFPs on both reflective and transmissive LCDs have utilized twisted nematic LCDs, which rely on the principles of light polarization and polarization analysis for their operation. This makes their integration with FOFPs difficult and relatively inefficient since FOFPs do not preserve light polarization during internal reflection.

SUMMARY OF THE INVENTION

The present invention provides a non-polarizing, Bragg-reflecting LCD having a FOFP that reflects light in a symmetric output cone. The FOFP serves as the top substrate of the display to enhance light collection efficiency and viewing angle performance. The FOFP improves the overall off-specular viewing performance of the display by averaging azimuthal and declination angle components of both incident and reflected light. Monochrome reflective displays that operate on Bragg's principal are severely limited in viewing angle because of the wavelength shift and luminance decay that occurs off the plane of incidence to the display. The FOFP stabilizes the chromaticity and effective reflected luminance for larger viewing angles. In addition, the FOFP may eliminate noticeable inhomogenities in reflective mode displays.

For purposes of the present invention, the term FOFP is interpreted in its broadest sense as any material which embodies the essential optical properties of a FOFP. Thus, the functioning of the present invention is not dependent upon the use of a fused plate of optical fibers but rather on any material layer, including a fused plate of optical fibers, which is capable of total internal reflection and rotational azimuthal and declination angle averaging. It should be apparent to those skilled in the art that these essential optical properties may be imparted to a range of materials, thus producing FOFP optical equivalents. These could include micro-machined or preformed glass or plastic substrates with a plurality of optical features, a variety of polymer networks containing a duality of materials with differing refractive indices or birefringence produced by physical alignment or stress, or any other approach able to result in a substrate containing a plurality of cylindrical features whose boundaries are defined by a discontinuity of refractive indices.

Other objects, advantages and salient features of the invention will become apparent from the following detailed description taken in conjunction with the annexed drawings, which disclose preferred embodiments of the invention.

BRIEF DESCRIPTION OF DRAWINGS

The invention will be described with reference to the following drawings in which like reference numerals refer to like elements and wherein:

FIG. 11 shows the effect of light diffraction in a FOFP that is at an oblique angle to the surface.

DETAILED DESCRIPTION OF PREFERRED EMBODIMENTS

The present invention enhances the viewing performance of refracted LCDs that operate on Bragg's principle. Unlike the prior art LCDs, the present invention does not require polarizers, which makes integration with the FOFP much simpler and more efficient.

FIGS. 1–5 show existing LCDs that operate on the Bragg principle and the range of LC configurations that correspond with the present invention. In other words, the LC material of the present invention may include cholesteric liquid crystals, polymer stabilized cholesteric textures, surface stabilized cholesteric textures, polymer-dispersed cholesteric liquid crystals and holographically formed polymer dispersed liquid crystals.

Figure 1A:
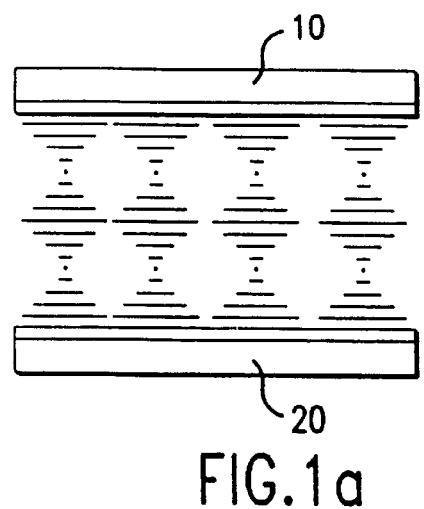
FIGS. 1a–1c show a cholesteric reflecting display.
Figure 1B:
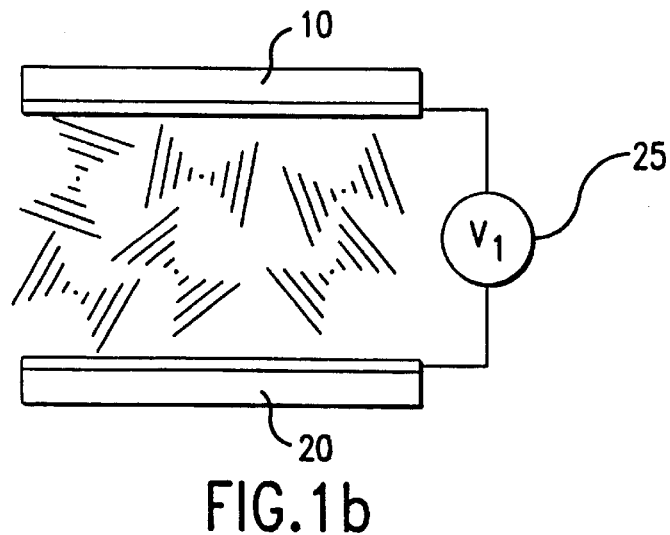
Figure 1C:
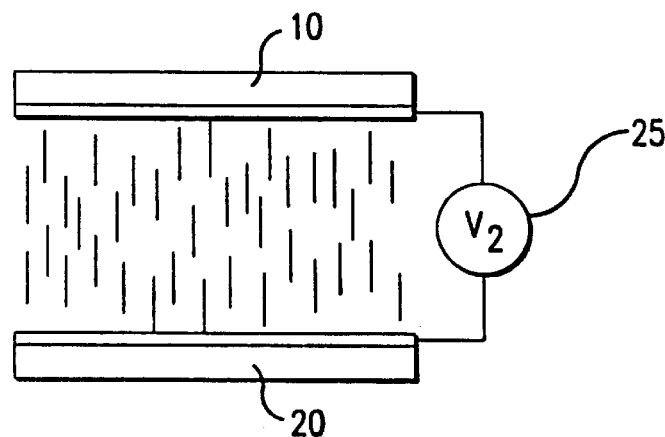
Figure 2A:
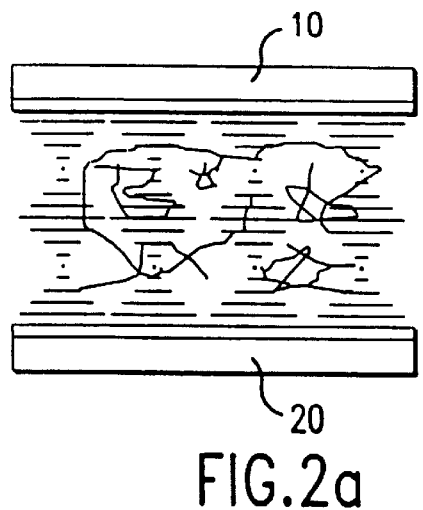
FIGS. 2a–2c show a polymer stabilized cholesteric texture display.
Figure 2B:
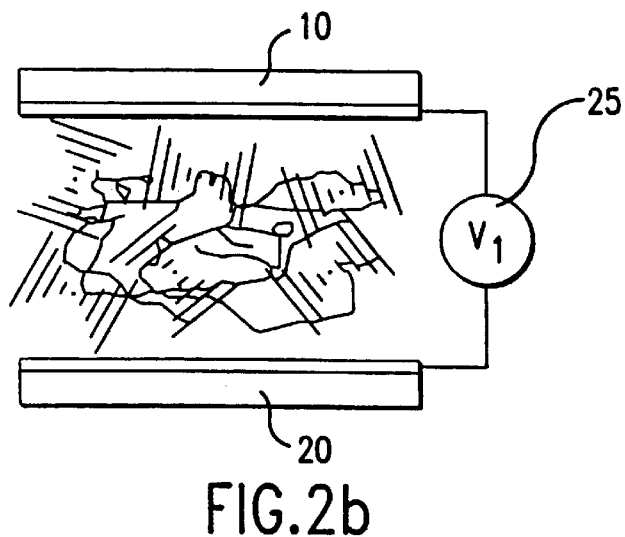
Figure 2C:
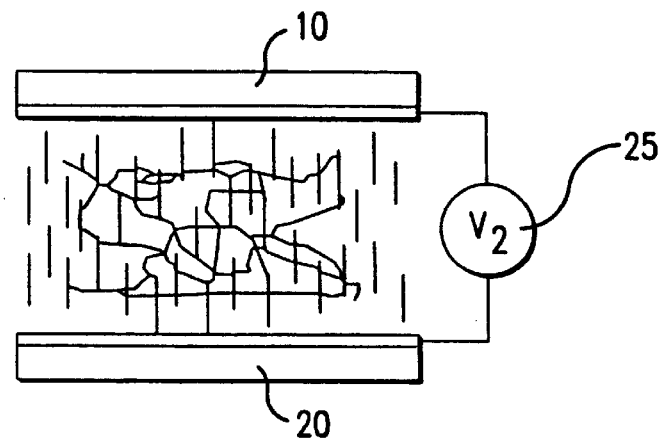
Figure 3A:
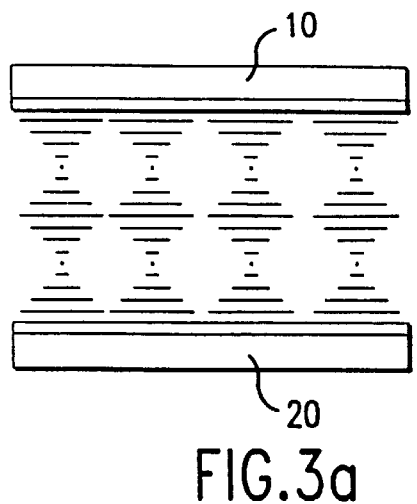
FIGS. 3a–3c show a surface stabilized cholesteric texture display.
Figure 3B:
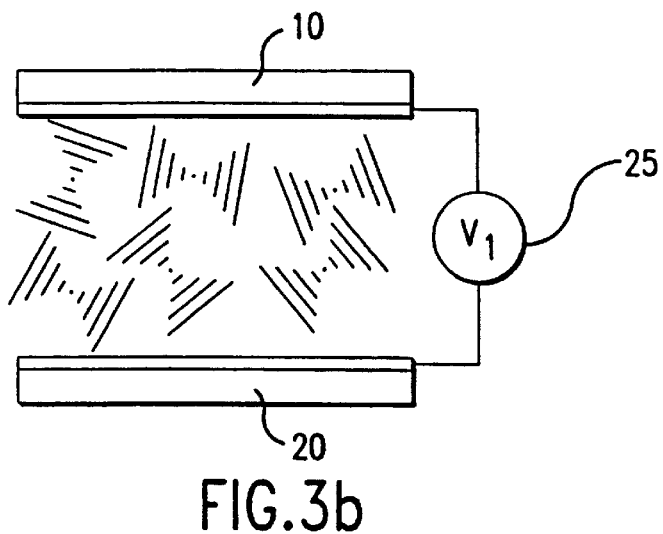
Figure 3C:
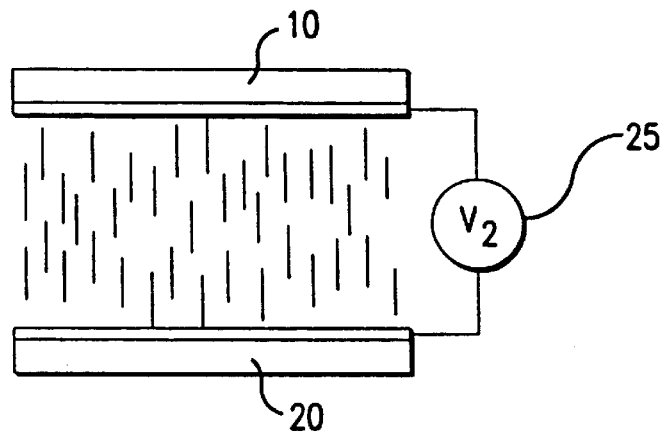
Figure 4A:
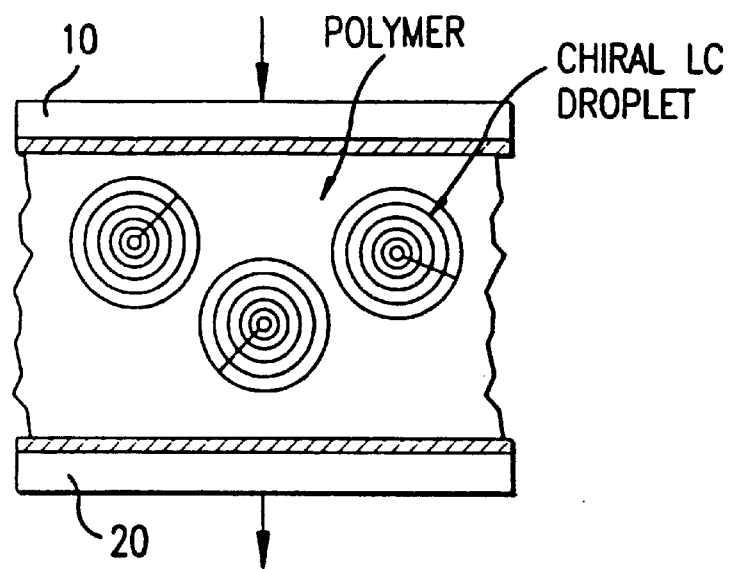
FIGS. 4a–4b show a polymer dispersed cholesteric liquid crystal display.
Figure 4B:
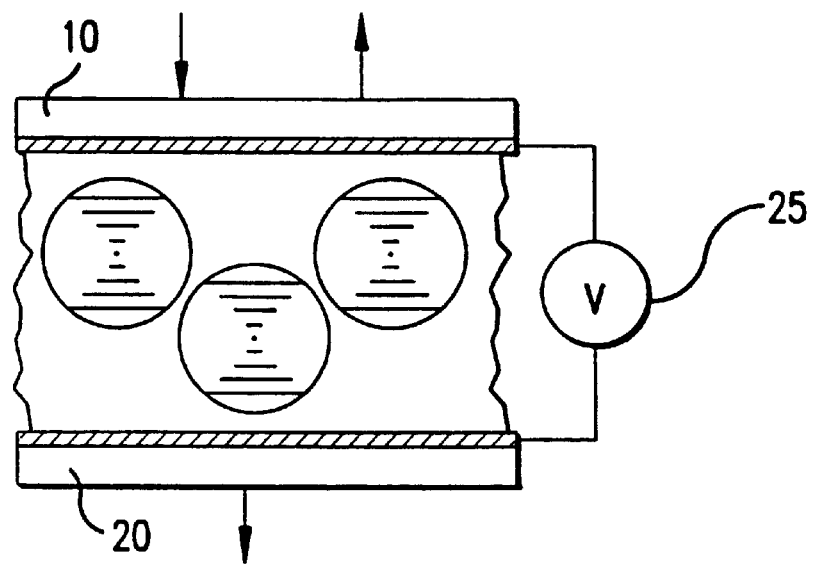
Figure 5A:
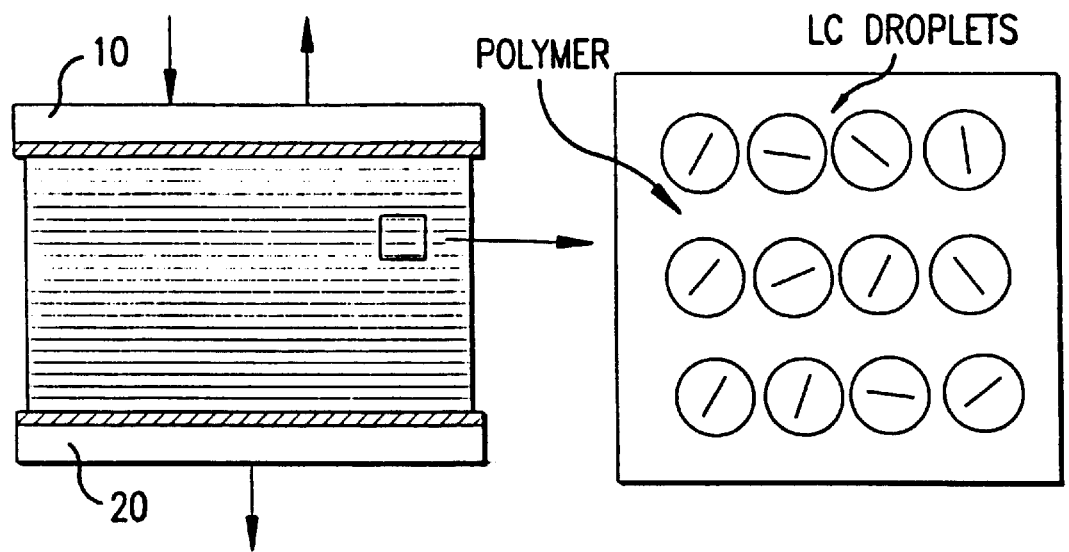
FIGS. 5a–5b show a holographically formed polymer dispersed liquid crystal display.
Figure 5B:
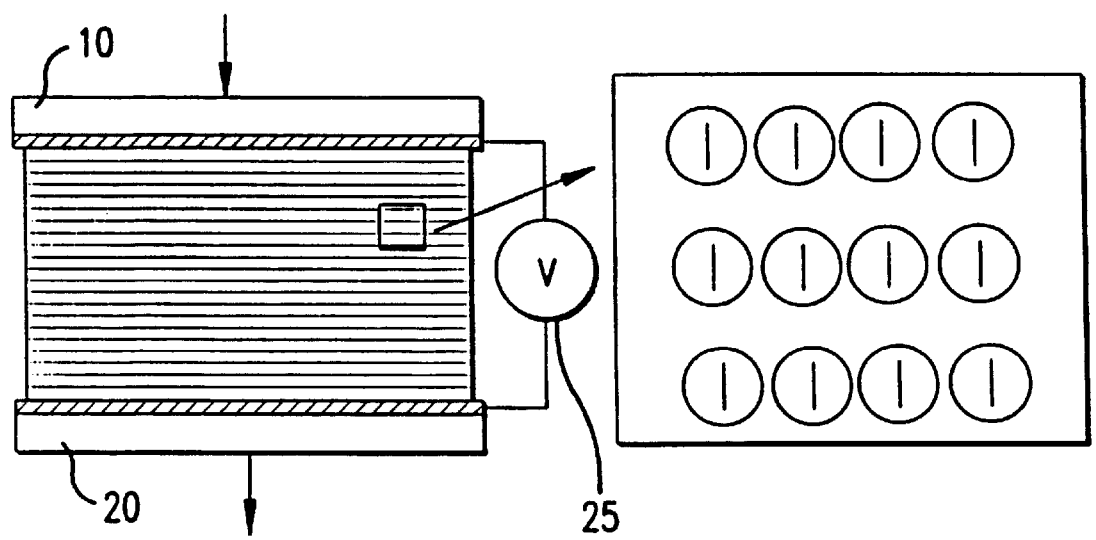
Figure 6A:
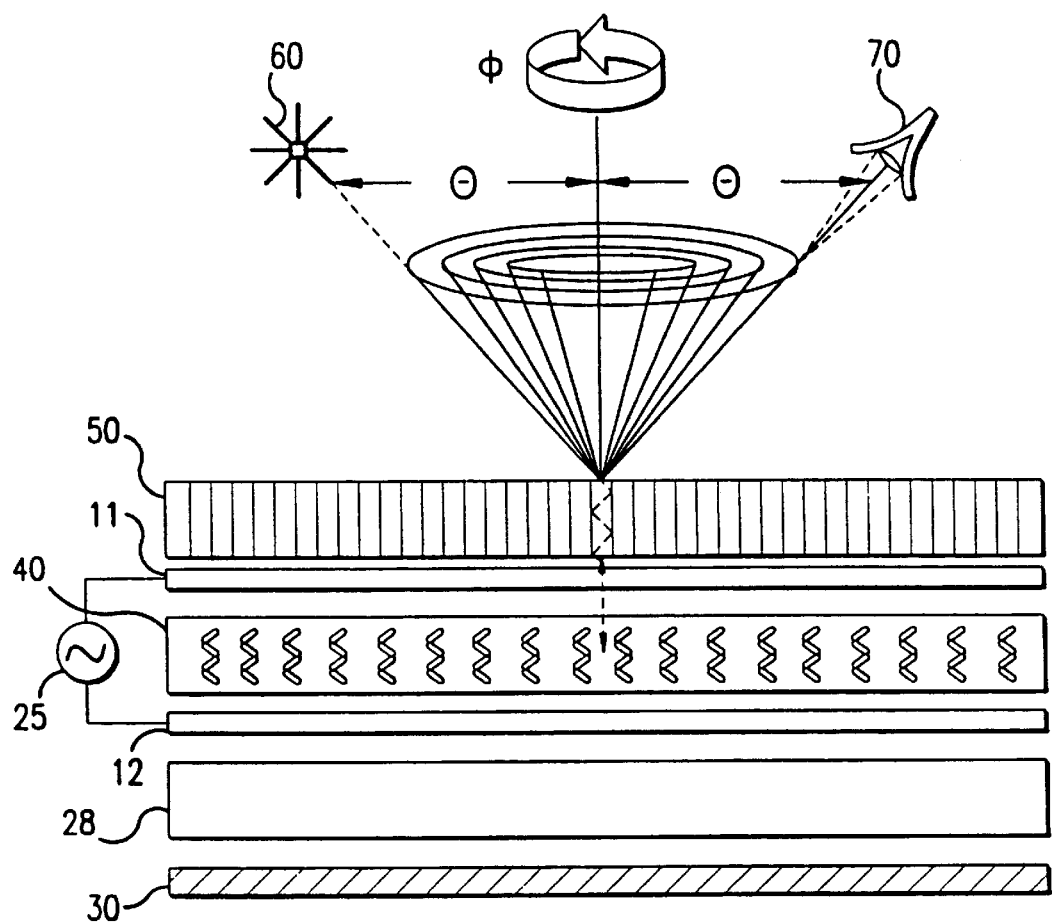
FIGS. 6a–6b show liquid crystal displays of the present invention.
Figure 6B:
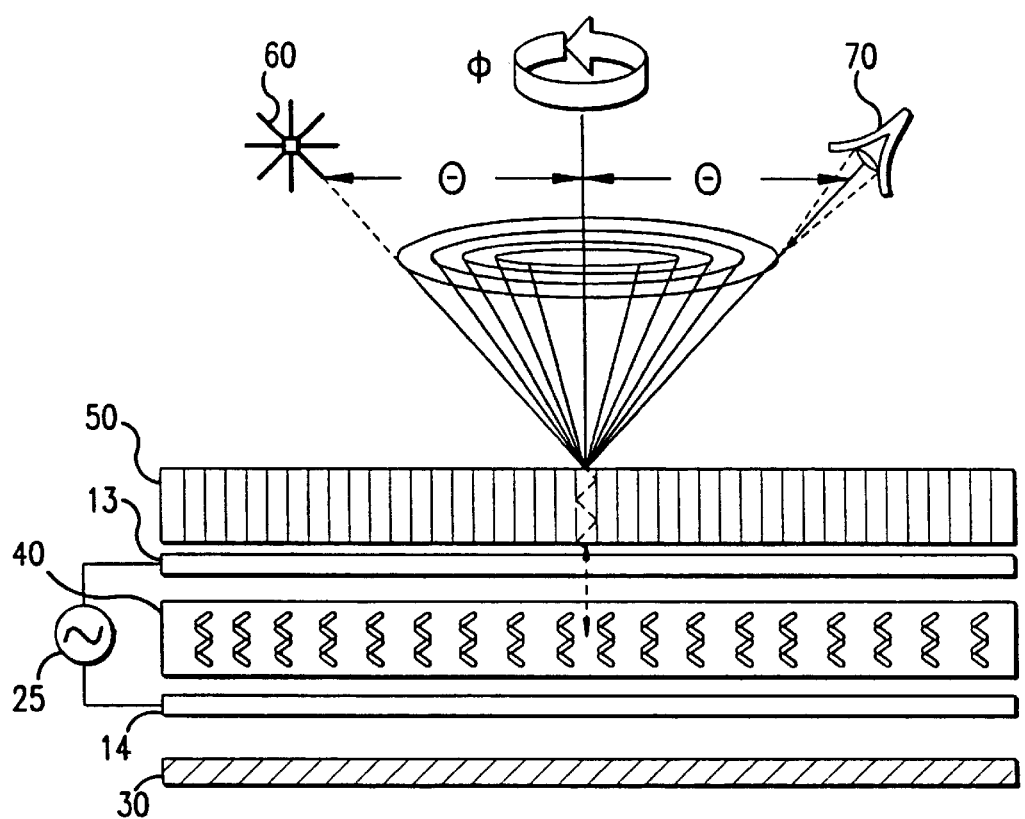

As shown in FIG. 6a, the present invention includes a FOFP 50 that functions as the top substrate or containing element of the display. Alternatively, the FOFP 50 may be on the front substrate as shown in FIG. 6b. The FOFP 50 enhances the effective viewing angle on reflectance and also minimizes the undesirable appearance of inhomogenities in the display.

The most dominant effect of the FOFP 50 is the increased reflectance at non-specular viewing angles. In operation of the Bragg-reflecting, non-polarizing display, the optimal display image reflectance occurs at the specular angle, where both incident illumination and the observer lie in the same plane. In prior art displays, additional unwanted specular reflections from the front surface and other internal optical layers makes the reliance on a specular observation angle very undesirable. However, the FOFP 50 actually collects light at all angles within the canonical region, including the specular angle, and provides an averaged reflected output over all azimuthal and declination angles thereby enhancing the reflectance and enabling effective non-specular viewing directions. U.S. application Ser. No. 08/761,992, discusses the azimuthal averaging of a FOFP in greater detail.

In addition to the FOFP 50 in FIG. 6a, the display may also includes ITO electrodes 11, 12 and LC material 40 interposed between the ITO electrodes 11, 12. A substrate 28 such as glass may also be provided. A voltage source 25 may be connected between the electrodes 11, 12 to provide a varying voltage. A black absorber 30 may be provided on the bottom of the LCD to absorb non-reflected light. As discussed above, the LC material 40 may include any one of cholesteric liquid crystals, polymer stabilized cholesteric textures, surface stabilized cholesteric textures, polymer-dispersed cholesteric liquid crystals and holographically formed polymer dispersed liquid crystals. The LC material 40 may also include any other type of Bragg-reflecting LC material that is selectively reflective of a desired wavelength of light.

In FIG. 6b, first and second substrates 13 and 14 are provided each having ITO electrodes. The FOFP 50 is then provided on the front side of the first substrate 13.

Light from illumination source 60 is incident on the FOFP 50 at an angle θ with respect to a normal to the plane of the FOFP 50. The light from source 60 is averaged over azimuth, Φ, and declination, θ, by the FOFP 50. The light is then reflected from LC material 40 and re-enters the FOFP 50. The light is again averaged over azimuth and declination by FOFP 50. The light that enters the observer's eye 70 has therefore been averaged over azimuth and declination twice and provides effective and symmetric viewing characteristics at all viewing positions. Effective reflectance of the display is no longer restricted to the specular angle. The image from the display is much more homogeneous in color and luminance over viewing angle than the same display image without the FOFP 50.

Figure 7:
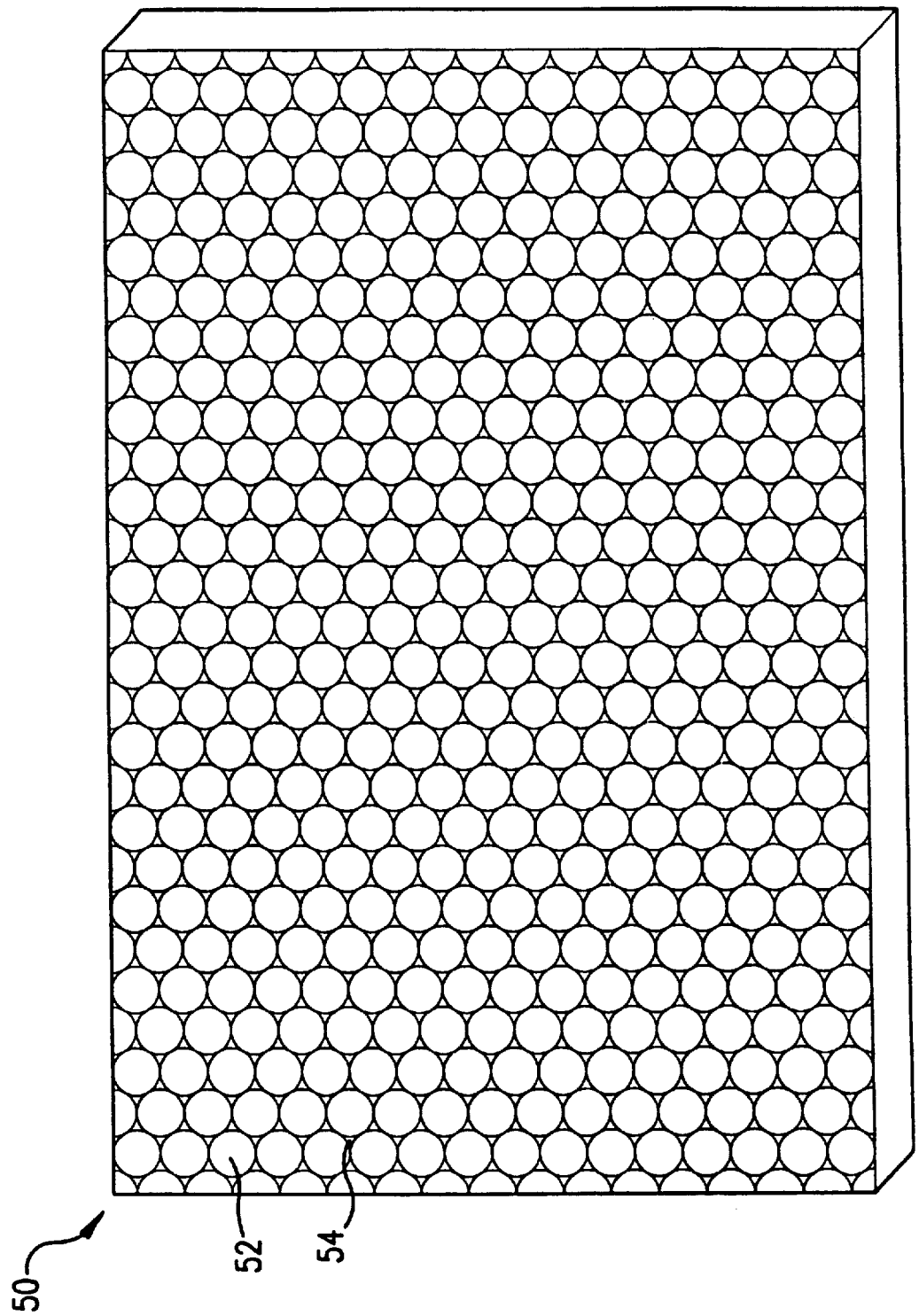
FIG. 7 is one embodiment of the FOFP of the present invention.
Figure 8:
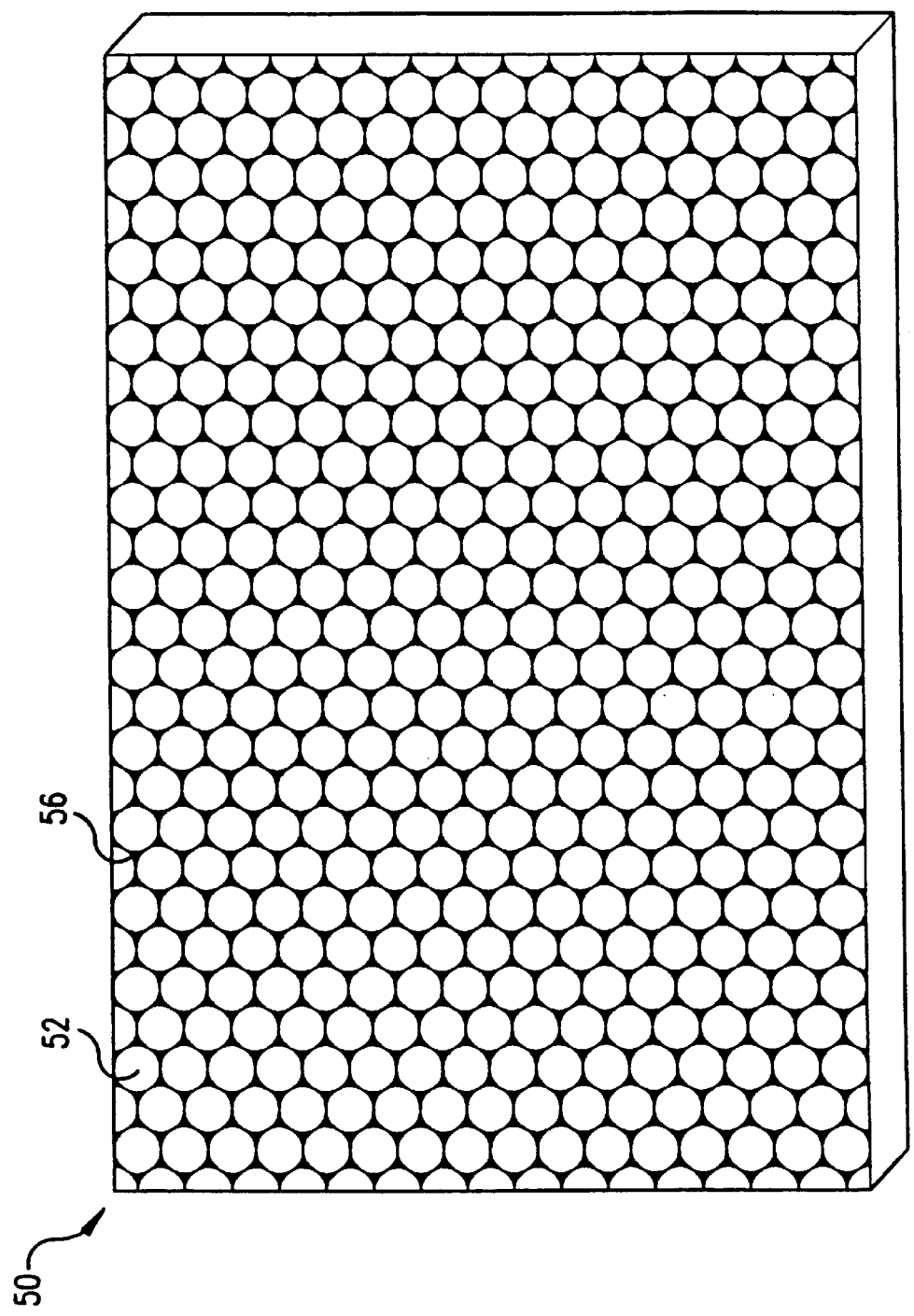
FIG. 8 is another embodiment of the FOFP of the present invention.
Figure 10:
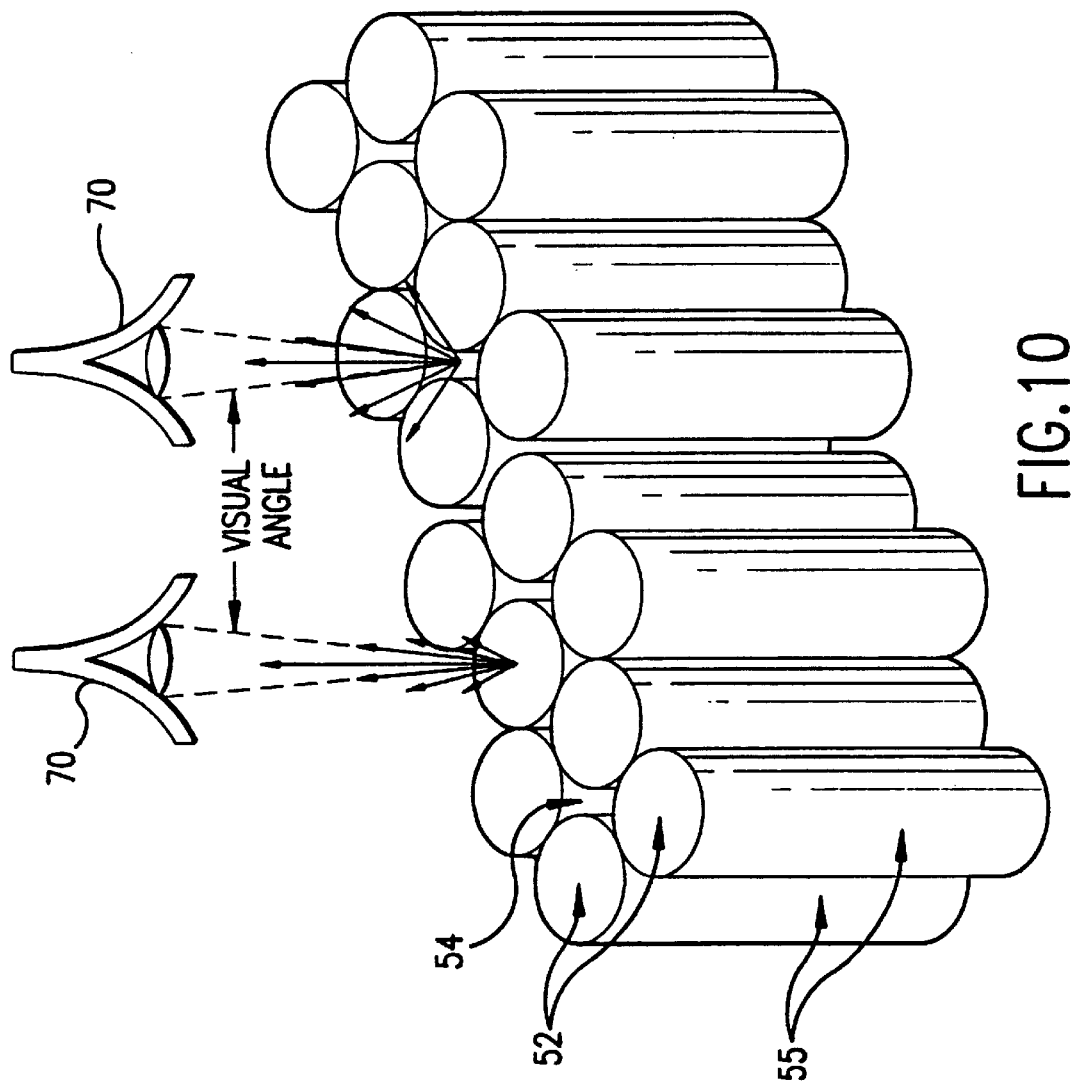
FIG. 10 shows the effect of light diffraction in a FOFP for light that is normal to the surface.

FIG. 7 shows one embodiment of a FOFP 50 having rounded members 55, each rounded member 55 comprising optical fibers 52 and transparent cladding material 54, as shown in FIGS. 10 and 11. FIG. 8 shows another embodiment of a FOFP 50 with the surface masked with opaque cladding apertures 56. This may be accomplished by coating the FOFP 50 with a blocking layer that covers only the cladding apertures of the FOFP 50. This coating can be, for example, a metal-metal oxide anti-reflective coating applied over the FOFP 50 and then pattern away over the fiber openings while maintaining the opaque coating on the cladding apertures. The anti-reflective nature of the coating reduces ambient reflections from the FOFP 50. This blocks the diffracted light in the dark-state from high-luminance off-axis directions from coupling onto the on-axis direction which greatly improves the on-axis and overall contrast ratio. Other coating methods are also within the scope of this invention. For example, the fiber cores and the cladding materials may be made from chemically different materials. The FOFP can then be treated with gas to turn the cladding opaque. U.S. Pat. No. 5,442,467 and U.S. application Ser. Nos. 08/473,887 and 08/761,992 discuss the optical properties in greater detail including opaquely marking the cladding apertures.

Figure 9A:
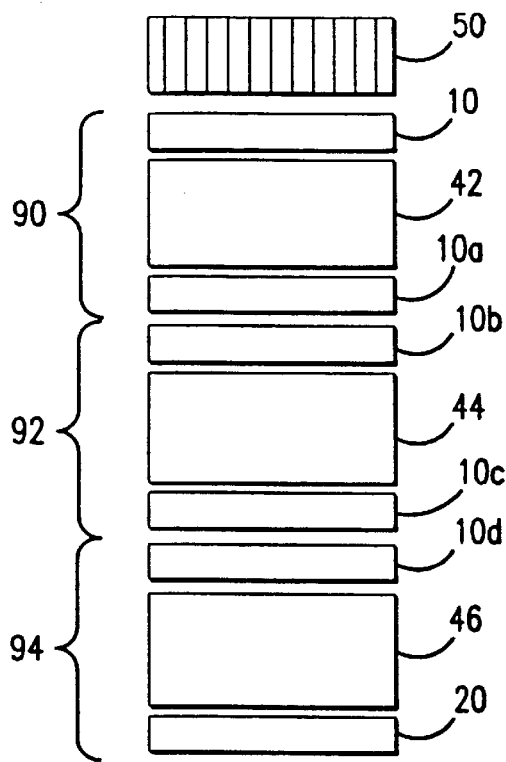
FIGS. 9a–9b show other embodiments of the liquid crystal display according to the present invention.

FIG. 9a also shows a Bragg-reflecting non-polarizing LC display according to the present invention. Three separate LC cells 90, 92 and 94 are provided within the display apparatus. The first cell 90 includes first substrate 10 and second substrate 10a. The LC material 42 is located between the first and second substrates 10, 10a and is reflective of a desired wavelength of light. The second LC cell 92 includes third substrate 10b and fourth substrate 10c located on opposite sides of the LC material 44 that is reflective of a wavelength of light different than the wavelength corresponding to the LC material 92 of the first cell 90. The third cell 94 includes fifth substrate 10d and sixth substrate 20 located on opposite sides of the LC material 46 that is reflective of a wavelength of light different than the wavelength corresponding to the LC material 42 and 44 of the first cell 90 and the second cell 92. As is understandable to one skilled in the art, each of the cells reflects a different wavelength of light. The FOFP 50 is located on the side of the first substrate 10 opposite from the LC material 42. Voltage sources (not shown in FIG. 9) alter the LC material 42, 44 and 46 and thereby reflect the selective wavelengths as is apparent to one skilled in the art. Intermediate substrates 10a, 10b, 10c and 10d may be reduced or eliminated to eliminate parallax effects. Furthermore, FOFP 50 may function as the top substrate or containing element of the display as in FIG. 6a.

Figure 9B:
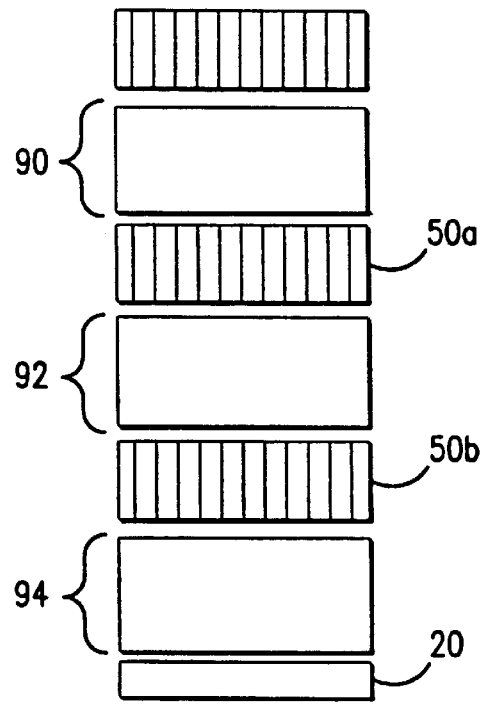

FIG. 9b shows a further non-polarizing Bragg-reflecting display in which FOFPs 50a and 50b are provided between each of the respective LC cells 90, 92 and 94. Although not shown, ITO electrodes are also provided as in other embodiments.

The FOFP 50 is utilized with any type of non-polarizing Bragg-reflecting display such as described above. Other Bragg-reflecting displays can also use the FOFP 50 of the present invention. This provides several important advantages. First, there is an enhanced reflected luminance at non-specular angles. Second, angular chromaticity shifts resulting from anisotropies in LC configurations and illuminant spectral power distributions are minimized or eliminated. Third, the FOFP minimizes observed inhomogeneities in display texture. As shown in FIGS. 6a and 6b, the incident light is funneled through the FOFP 50, and impinges on the reflecting LC material 40. The light reflected from the material 40 is then transferred back out the FOFP 50 to the observer's eye 70. The light that is incident on the cell is azimuthally averaged before the LC cell and the light reflected by the LC material 40 is again averaged via a second pass through the FOFP 50.

For Bragg-reflecting LC cells, the highest reflection efficiency is obtained at the specular angle. However, this viewing direction is poor in prior art devices because the ambient light is also spectrally reflected off the top substrate and other internal optical layers. The FOFP 50, comprising round members 55, collects light from all incident angles and azimuthally averages it over angle φ and declination angle θ thereby enhancing reflectance at all non-specular viewing directions and relaying light in a symmetric cone to increase the viewing angle, as shown, for example, in FIGS. 6a, 6b and 10. FOFPs also minimize wavelength shifts at wide viewing angles making the shift in color not as noticeable. Also any inhomogeneities in the display texture are removed by the azimuthal averaging effect of the FOFP 50.

While the invention has been described in relation to preferred embodiments, many modifications and variations are apparent from the description of the invention, and all such modifications and variations are intended to be within the scope of the present invention as defined in the appended claims.

What is claimed is:

1. A non-polarizing, Bragg-reflecting liquid crystal display, comprising:
   a fiber-optic faceplate composed of rounded members located on a front side of the display;
   a first substrate; and
   a non-polarizing, Bragg-reflecting liquid crystal material located between the first substrate and the fiber-optic faceplate, wherein the fiber-optic faceplate relays light in a symmetric cone thereby increasing the viewing angle.

2. The liquid crystal display of claim 1, further comprising a second substrate located between the fiber-optic faceplate and the liquid crystal material.

3. The liquid crystal display of claim 2, wherein the first substrate includes a first set of electrodes and the second substrate includes a second set of electrodes, and the display further comprises at least one voltage source connected between the first set of electrodes and the second set of electrodes.

4. The liquid crystal display of claim 1, wherein the fiber-optic faceplate includes optical fibers extending between a front face and a rear face of the fiber-optic faceplate and fiber cladding material located between different ones of the optical fibers, the fiber cladding material being opaquely masked on at least the front face.

5. The liquid crystal display of claim 4, wherein the opaquely masked fiber cladding material is formed by applying an anti-reflective coating over the fiber-optic faceplate and patterning the anti-reflective coating at areas away from cladding material apertures.

6. The liquid crystal display of claim 4, wherein the masked cladding material prevents the fiber cladding material from diffracting off-axis light into an observer's viewing cone.

7. The liquid crystal display of claim 1, wherein the liquid crystal material includes one of cholesteric liquid crystal, polymer stabilized cholesteric textures, surface stabilized cholesteric textures, polymer-dispersed cholesteric liquid crystals and holographically formed polymer dispersed liquid crystals.

8. The liquid display of claim 1, wherein the fiber-optic faceplate functions as a top substrate of the display.

9. The liquid crystal display of claim 1, further comprising a black absorber on a side of the first substrate opposite from the liquid crystal material.

10. A liquid crystal display, comprising:
    first and second substrates;
    first non polarizing, Bragg-reflecting liquid crystal material located between the first and second substrates;
    a third substrate;
    second non-polarizing, Bragg reflecting liquid crystal material located between the second and third substrates;
    a fourth substrate; and
    third non-polarizing, Bragg-reflecting liquid crystal material located between the third and fourth substrates, wherein the first, second and third liquid crystal materials reflect light of first, second and third wavelengths, respectively, the first substrate is located on a front side of the display and includes a fiber-optic faceplate composed of rounded members, and the fiber-optic faceplate relays light in a symmetric cone thereby increasing the viewing angle.

11. The liquid crystal display of claim 10, wherein the second and third substrates each include a fiber-optic faceplate.

12. The liquid crystal display of claim 10, further comprising:
    a fifth substrate located between the fiber-optic faceplate and the first liquid crystal material;
    a sixth substrate located between the second substrate and the second liquid crystal material; and
    a seventh substrate located between the third substrate and the third liquid crystal material.

13. The liquid crystal display of claim 12, further comprising:
    a first voltage source connected to the fifth and second substrates;
    a second voltage source connected to the third and sixth substrates; and
    a third voltage source connected to the fourth and seventh substrates.

14. The liquid crystal display of claim 10, wherein the fiber-optic faceplate includes optical fibers extending between a front face and a rear face of the fiber-optic faceplate and fiber cladding material located between different ones of the optical fibers, the fiber cladding material being opaquely masked on at least the front face.

15. The liquid crystal display of claim 14, wherein the opaquely masked cladding material is formed by applying an anti-reflective coating over the fiber-optic faceplate and patterning the anti-reflective coating at areas away from cladding material apertures.

16. The liquid crystal display of claim 14, wherein the masked fiber cladding material prevents the fiber cladding material from diffracting off-axis light into an observer's viewing cone.

17. The liquid crystal display of claim 14, wherein the liquid crystal material includes one of cholesteric liquid crystal, polymer stabilized cholesteric textures, surface stabilized cholesteric textures, polymer-dispersed cholesteric liquid crystals and holographically formed polymer dispersed liquid crystals.

18. A liquid crystal display, comprising:
    a non-polarizing, Bragg-reflecting liquid crystal material selectively reflective of a desired wavelength of light; and
    a fiber-optic faceplate composed of rounded members located on the liquid crystal material, wherein the fiber-optic faceplate relays light in a symmetric cone thereby increasing the viewing angle.

19. The liquid crystal display of claim 18, further comprising a first substrate located between the liquid crystal material and the fiber-optic faceplate and a second substrate located on a side of the liquid crystal material opposite the first substrate.

20. The liquid crystal display of claim 18, wherein the liquid crystal material includes one of cholesteric liquid crystal, polymer stabilized cholesteric textures, surface stabilized cholesteric textures, polymer-dispersed cholesteric liquid crystals and holographically formed polymer dispersed liquid crystals.

21. The liquid crystal display of claim 18, wherein the fiber-optic faceplate functions as a top substrate of the display; and
    the display further comprises a substrate located on a side of the liquid crystal material opposite the fiber-optic faceplate.

* * * * *